United States Patent Office 3,744,986
Patented July 10, 1973

3,744,986
METHOD FOR THE PRODUCTION OF HORTICULTURAL SOILS
Ehrenfried Grosse-Brauckmann, Bonn, Herman Kick, Rottgen, and Gottfried Nettesheim, Wesseling, Germany, assignors to Union Rheinische Braunkohlen Kraftstoff Aktiengesellschaft, Wesseling, near Cologne, Germany
No Drawing. Continuation-in-part of abandoned application Ser. No. 850,230, Aug. 14, 1969. This application Sept. 28, 1971, Ser. No. 184,632
Int. Cl. C05f 11/02
U.S. Cl. 71—24      3 Claims

ABSTRACT OF THE DISCLOSURE

Production of horticultural soils which give faster and stronger growth of flowers and vegetables by mixing lignite and peat in the ratio of 0.7–1.5 to 1 and adding organic fertilizer compounds.

CROSS-REFERENCE TO RELATED APPLICATION

This application is a continuation-in-part of our co-pending application Ser. No. 850,230 filed Aug. 14, 1969, now abandoned.

BACKGROUND OF THE INVENTION

The present invention relates to a method for the production of horticultural soils, e.g. as they are used in greenhouses for the cultivation of flowers and vegetables.

Horticultural soils normally consist of mixtures of peat with woody-soil, marshy-soil, sand, loam or clay, to which mineral and organic fertilizers are added. It has been tried to improve these soils by adding mineral wool or foamy plastics, or in order to achieve a greater permeability of air by adding gravelly sand.

DETAILED DESCRIPTION

According to the present invention, it has been discovered that by adding lignite to the peat in the ratio of generally 0.5–2.0 to 1 and more specifically 0.7–1.5 to 1 horticultural soil can be obtained that is very useful. These compositions of lignite and peat are more effective than peat alone. They have a good crumbly structure and can be produced at very moderate prices. The porosity of such mixtures proved to be the same or even greater than the porosity of peat alone. They are in the range of about 40 to 45%. The results obtained with the lignite/peat combinations of the said ratio are so much more surprising, as lignite in the agricultural use alone does have very little or no effect at all on the increase of the output. The mixtures of peat and lignite are especially useful after the admixture of the mineral salts, suitable as fertilizers containing nitrogen, phosphorus and kalium. Instead of mineral salts as well as in addition to them, it is advantageous to add an organic fertilizer such as horny flour, e.g. obtained by grinding the hoofs or horns of cattle, manure of poultry, mud of public waters such as sludge obtained in municipal public sewage plants, and so forth. Such organic fertilizers, combined with lignite and peat, have surprisingly an even better effect than mixtures with correspondingly high additions of mineral fertilizers, i.e. the combined fertilizer results in a substantially faster and stronger growth.

Example 1

Mustard seeds were used as test-fruit in a series of pots filled with a horticultural soil consisting of a mixture of lignite and peat (1:1). After manuring the soil with equal additions of lime, nitrogen, phosphorus and potash, an average result of 10 g. dry weight per pot was obtained, whereas the result was 7.5 g. with corresponding pots filled with peat only. Also the germination and growing of the plants took place in a more rapid way in the mixture of lignite and peat.

Example 2

Mustard seeds were used as test-fruit in a series of 10 pots each filled up with a horticultural soil consisting of a mixture of lignite and peat (1:1). After manuring the soil with small equal additions of lime, nitrogen, phosphorus, potash, and about 3% by weight of a sludge of a municipal public sewage plant an average result of 12.4 g. dry weight per pot was obtained, whereas the result was 8.9 g. with corresponding pots filled up with peat only. Also the germination and growing of the plants took place in a more rapid way in the mixture of lignite and peat.

Example 3

Summer rye was used as test-plant. A small amount of manure of poultry containing 3.5 g. of nitrogen, 4.52 g. of $P_2O_5$, and 2.23 g. of $K_2O$ was added to 9 liters each of different horticultural soils.

| The yields were in— | Peat | Peat/lignite (1:1) | Lignite |
|---|---|---|---|
| Grain, g./pot | 46.6 | 48.8 | 43.2 |
| Straw, g./pot | 85.7 | 84.3 | 72.5 |

The growth of the rye in the pot containing the mixture of peat and lignite was remarkably different from that in the other pots.

Example 4

Summer rye was used as test-plant. About 15% by weight of manure of poultry containing 4.5 g. of nitrogen, 5.8 g. of $P_2O_5$, and 2.8 g. of $K_2O$ were added to 12 liters each of different horticultural soils, which were used in series of 10 pots each.

| The average yields were in— | Peat alone | Peat/lignite (1:1) | Lignite (alone) |
|---|---|---|---|
| Grain, g./pot | 46.0 | 47.9 | 42.7 |
| Straw, g./pot | 84.9 | 84.2 | 71.1 |

If the same amount of nitrogen, phosphorus, and kalium was added in form of commercial fertilizers instead of the manure of poultry the growth of the grains was somewhat inhibited by the nitrogen-content of the mineral salt. The yield of straw was in

|  | G./pot |
|---|---|
| Peat alone | 60.2 |
| Peat/lignite (1:1.2) | 67.2 |
| Lignite alone | 48.6 |

Example 5

A test with wheat was carried out in series of 15 pots each manured with 7% by weight of a sludge of a municipal public sewage plant, based on the different horticultural soils. The yield of grains was in the case of a mixture of lignite to peak of 1:0.65 equal to the crop obtained with peat alone, in the case of a mixture of 1:0.75 about 2%, and in the case of a mixture of 1:1 about 19% greater, both percentages by weight, related to the yield obtained with peat alone as the horticultural soil.

Example 6

Grape-seed was tested in series of 10 pots each with different horticultural soils manured with 3% by weight of horny flour. There were obtained the following average yields:

| Horticultural soil | Dry grain, g. per pot |
|---|---|
| Peat alone | 8.4 |
| Mixture of lignite and peat: | |
| 1 to 1.7 | 7.9 |
| 1 to 1.5 | 8.3 |
| 1 to 1.1 | 8.8 |
| 1 to 0.7 | 8.1 |
| 1 to 0.4 | 6.1 |

Therefore the best results for suitable mixtures are about 1:1.5 and 1:0.7.

What is claimed is:
1. A method for producing horticultural soils comprising mixing lignite and peat in the ratio of about .7–1.5 to 1 and adding to the mixture an organic compound suitable as fertilizers selected from the group consisting of sludge of municipal public sewage plants, manure of poultry, and ground horns and hoofs of cattle.

2. The method of claim 1 wherein about 15% by weight of the organic compound is added to the mixture.

3. The method of claim 1 wherein the organic compound is horny flour.

References Cited
UNITED STATES PATENTS

| | | | |
|---|---|---|---|
| 3,547,612 | 12/1970 | Westelaken | 71—21 |
| 3,645,714 | 2/1972 | Heming et al. | 71—64 GR |
| 3,573,892 | 4/1971 | Atkins et al. | 71—64 GR |

SAMIH N. ZAHARNA, Primary Examiner

R. BARNES, Assistant Examiner